United States Patent [19]

Haering et al.

[11] 4,233,377

[45] Nov. 11, 1980

[54] ELECTRICAL STORAGE DEVICE

[76] Inventors: Rudolph R. Haering, 647 Croydon Pl., Vancouver, B.C.; James A. R. Stiles, 4133 Fairway Pl., North Vancouver, B.C., both of Canada

[21] Appl. No.: 922,199

[22] Filed: Jul. 6, 1978

[30] Foreign Application Priority Data

Jul. 14, 1977 [CA] Canada ............................... 282696

[51] Int. Cl.³ ............................................ H01M 4/58
[52] U.S. Cl. ............................................ 429/218
[58] Field of Search ............................... 429/218, 194

[56] References Cited

U.S. PATENT DOCUMENTS

| | | | |
|---|---|---|---|
| 4,009,052 | 2/1977 | Whittingham | 429/194 X |
| 4,049,879 | 9/1977 | Thompson | 429/218 |
| 4,049,887 | 9/1977 | Whittingham | 429/218 X |
| 4,084,046 | 4/1978 | Whittingham | 429/218 X |
| 4,091,191 | 5/1978 | Gaines | 429/194 |

Primary Examiner—Charles F. LeFevour

[57] ABSTRACT

A battery having a layered transition metal dichalcogenide cathode in which has been incorporated by intercalation a relatively small amount of a dopant material having a relatively large atomic or ionic size so as to spread apart adjacent molecular layers in the cathode material and permit more rapid intercalation of cations during the battery discharge, an anode, and an electrolyte which will permit the migration of cations from the anode to the cathode. The preferred dopants are sodium or potassium and the invention is chiefly applicable to a battery having a molybdenum disulphide cathode.

17 Claims, 5 Drawing Figures

DEPENDENCE OF BATTERY CAPACITY ON DISCHARGE RATE

ELECTRICAL STORAGE DEVICE

BACKGROUND OF THE INVENTION

1. Field of the Invention

This invention relates to layered transition metal dichalcogenide storage cells (hereinafter "batteries") with improved capacity and discharge rate or current.

It is an object of the present invention to provide a battery having a high energy storage density.

It is another object of the invention to provide a battery that uses relatively inexpensive material that is easily prepared for the cathode.

2. Description of the Prior Art

In an article in the journal Science, June 1976, M. S. Whittingham reported the development of a new battery storage system based on the intercalation of lithium in titanium disulphide. This work is also described in U.S. Pat. No. 4,009,052 issued Feb. 22, 1977 to M. S. Whittingham and in Belgian Pat. No. 819,672 dated Sept. 9, 1974 (published Mar. 10, 1975).

Earlier work on chalcogenide batteries as evidenced by the paper and patents indicated above covered a large range of possible cathode materials but generally stressed the intercalation of lithium (Li) in titanium disulphide ($TiS_2$). The resulting $Li_xTiS_2$ battery system operates at ambient temperatures, has a high energy storage density (about 480 watt-hr/kg), and is highly reversible over the range $0 < x < 1$. When fully charged the cell has a open-circuit emf of 2.5 volts. During discharge, lithium from the electrolyte intercalates in the $TiS_2$ electrode and is replenished from the Li electrode as the open circuit emf drops to about 1.8 volts. At full discharge the open circuit emf falls to below 1 volt, corresponding to an electrode composition $Li_xTiS_2$ with $x = 1$. When $x = 1$, full intercalation has been achieved by the deposition of an atomic monolayer of Li between adjacent $TiS_2$ layers of the original electrode structure.

Several methods are known for accomplishing the intercalation of various materials into layered structures. For example, alkali metals may be intercalated into most transition metal dichalcogenides in liquid ammonia. This technique is described in a paper by W. Rudorff, Chimia 19,489 (1965). Vapor intercalation is described in a paper by Somoano, Hadek and Rembaum, AIP Conference on Superconductivity in d and f band metals, (D. H. Douglas Editor) p. 273 (1972). Another method is described in the paper "Intercalation from Aqueous Solution of $Na_2S_2O_4$" by Schollhorn, Sick and Lerf, Mat. Res. Bull. 10,1005 (1975). Finally, alkali metals and alkaline earth metals may be intercalated cathodically.

During discharge of a conventional intercalation battery, cations diffuse from the cathode surface (which is in contact with an electrolyte) to the cathode interior. Studies indicate that diffusion occurs along planes in the van der Waals gap (between adjacent transition metal dichalcogenide molecular layers) at a rate governed by the diffusion coefficient, D. It is further understood that diffused cations come to rest at symmetrically recurring sites which arise due to the relative spacing or positioning of adjacent molecular layers. Maximum capacity is apparently reached when all sites are occupied by diffused cations. In a conventional intercalation battery, the rate of diffusion of cations into the cathode is apparently inhibited by the size of the van der Waals gap. Thus, the battery discharge current which is directly proportional to the rate of cation diffusion is also inhibited.

SUMMARY OF THE INVENTION

It has been discovered by the inventors that the discharge rate and apparently also the capacity of a layered transition metal dichalcogenide storage battery can be improved in comparison with known batteries of the type by intercalating a dopant, present as ions, atoms or possibly molecules of selected elements, into the cathode. The cathode is preferably a molybdenum disulphide cathode. The selected dopant ions, atoms or molecules are selected to have a radius large compared to that of the cations migrating from anode to cathode in the battery. Thus if the anode is, for example, lithium, then sodium or potassium ions are suitable as dopants. Obviously the dopant must also be selected with a view to avoiding unwanted side effects of a chemical or physical nature.

Only a small amount of dopant need be used. If the dopant-cathode molecular composition is designated $$A_xZ,$$

where $A_x$ represents a dopant molecular concentration x for a given dopant substance A, and Z is the molecular composition of the undoped cathode, it has been found that the dopant is effective with values of x as low as 5%. Another way of expressing this is to say that as few as 5% of available intercalation sites in the undoped material may be occupied by dopant atoms, ions or molecules while obtaining a notable improvement in discharge current.

Since the physical events with which we are here concerned occur at the atomic or molecular level, it is difficult to be completely confident about the physical mechanism responsible for the success of the present invention. The immediately following explanation to be elaborated in the later detailed description is offered for the facilitation of comprehension of the invention by the reader, but of course the inventors cannot be certain that they or other scientists completely understand the phenomena involved.

If adjacent cathode molecular layers are spread apart to widen the van der Waals gap, cations can diffuse more quickly into the cathode, thus averting a concentration of cations at the cathode surface which if unchecked, would result in saturation of the cathode surface with cations before all available sites had been filled with diffused cations, ultimately reducing battery voltage to zero.

Pre-treating the cathode material with a suitably selected dopant apparently has the effect of spreading of adjacent cathode molecular layers to widen the van der Waals gap. For that reason, the dopant used must have a larger ionic or atomic radius than the cations to be diffused into the cathode during battery discharge.

Besides allowing an improved rate of diffusion of cations into the cathode, the addition of a dopant apparently serves to shift the relative symmetric spacing or positioning of adjacent molecular layers of transition metal dichalcogenide giving rise to the formation of additional sites in the van der Waals gap at which cations may be deposited. This again improves the rate of diffusion of cations into the cathode because the number of sites available for the deposit of cations is increased.

Apparently the layers of the cathode material are relatively "rigid" and thus only a relatively few intercalating dopant atoms or ions are required to spread the layers apart. Using more dopant than necessary tends to have the effect of filling intercalation sites that preferably should remain available for occupation by migrating cations. In practice, the battery designer will empirically select the amount of dopant used depending upon observations on discharge current, capacity etc. of varying amounts of dopant.

Cell capacity is improved by the invention because the improved diffusion rate allows the diffusion of more cations into the cathode before the cathode surface becomes saturated with cations unable to diffuse into the cathode.

Battery discharge current also improves in direct proportion to the increased rate of diffusion of cations into the cathode.

DETAILED DESCRIPTION WITH REFERENCE TO THE DRAWINGS

In a given cathode composed of material with average grain radius L (grain diameter 2L) and diffusion coefficient D, the characteristic time constant governing the diffusion of cations into the cathode is given by $$t = L^2/D \quad (1)$$

If the battery discharge current (which determines the rate of arrival of cations at the cathode surface) is higher than the rate at which cations can diffuse to the cathode interior, then full intercalation of the cathode will not occur. Rather, the surface of the cathode will become saturated with cations whereupon the battery voltage will drop to zero, corresponding to a fully discharged condition. Such premature saturation of the cathode surface corresponds to a capacity which is smaller than the maximum possible capacity, since cations are only deposited at sites in the surface region of the cathode. Maximum capacity can only be obtained if the discharge current is small enough to permit full intercalation by deposit of cations at each available site in the van der Waals gap, or if the discharge current is periodically interrupted and the battery is "rested". The rest periods provide an opportunity for achieving a uniform intercalation and hence a reduction of the surface cation concentration permitting a further discharge until full intercalation of the cathode is achieved.

The above discussion indicates that the battery capacity, Q, (usually specified in ampere-hrs. or watt hrs.) is inversely proportional to the discharge current, I, (specified in amperes). Under certain simplifying assumptions one may show that this relationship may be expressed parametrically by the equations $$It/Q_M = y \tanh y \quad (2a)$$

$$Q/Q_M = 1/y \tanh y \quad (2b)$$

Figure 1:
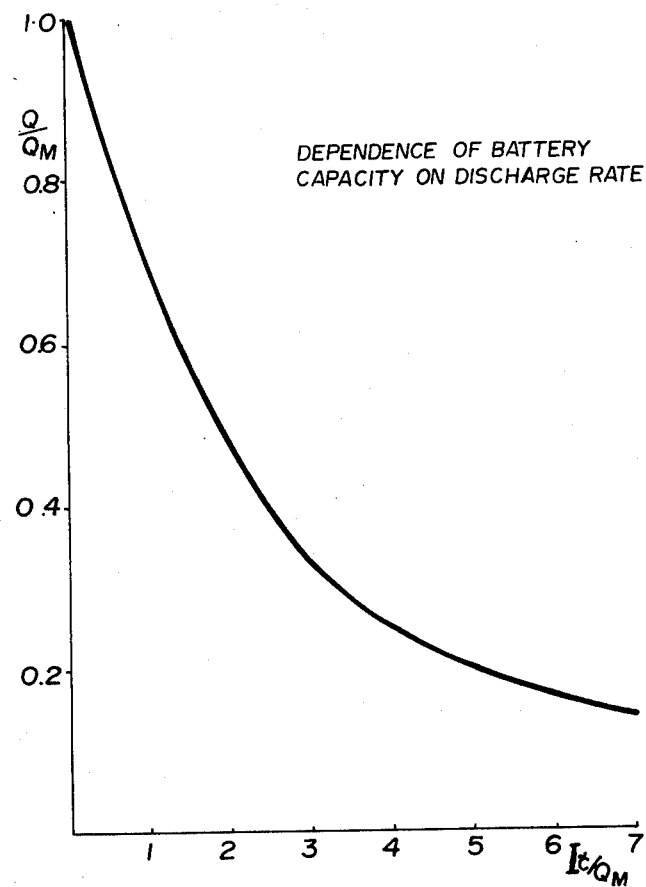
FIG. 1 is a graph showing the theoretical dependence of battery capacity on discharge rate.

In equations (2a) and (2b), t is the characteristic time constant given by equation 1, $Q_M$ is the maximum cathode capacity corresponding to full intercalation of the cathode and y is a parameter. FIG. 1 shows a plot of theoretical battery capacity vs. discharge rate, based on equations (2a) and (2b). FIG. 1 indicates how battery performance can be improved. For example, suppose that a certain intercalation battery, whose characteristic time constant, t, is $t_1$ is discharged at a rate corresponding to $It_1/Q_M = 4$. FIG. 1 indicates that in this case the available capacity Q is only $0.25Q_M$. If it is desired to increase the capacity to $0.9Q_M$ the discharge current must be reduced from I to 0.12I, given the same $t_1$. But if a method can be found to decrease the characteristic time constant, t, then battery capacity would again be improved. Suppose that in the above example the characteristic time constant $t_1$ is reduced to $t_{1/10}$. Then the available capacity, Q (at a given discharge current I) will be increased from $0.25Q_M$ to $0.87Q_M$. Alternatively, the discharge current (at an available capacity of $0.25Q_M$) may be increased from I to 10I.

On the basis of the above discussion it is possible to define a "Figure of Merit", F, for intercalation batteries, namely the product of the available capacity, Q, and the discharge current, I. Over most of the range shown in FIG. 1 this Figure of Merit is given by $$F = QI \cong Q_M^2/t \cong F_M \quad (3)$$

Figures 2A, 2B:
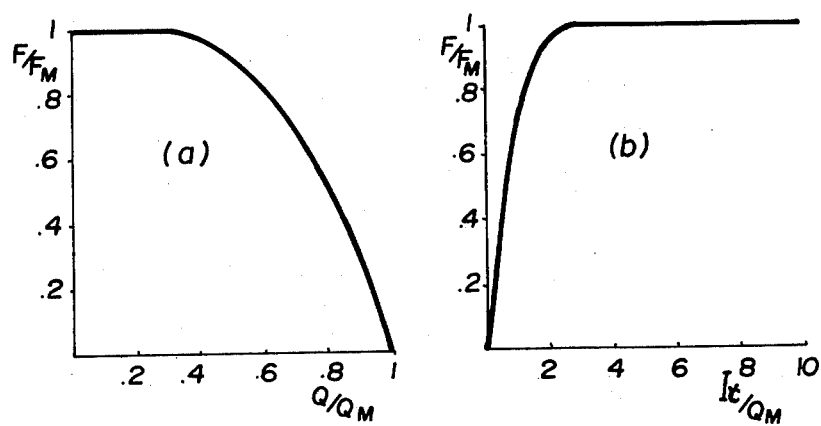
FIG. 2a is a graph showing the theoretical dependence of Figure of Merit on capacity.
FIG. 2b shows theoretical dependence of Figure of Merit on discharge rate.

The theoretical dependence of F on available capacity, Q, and discharge current, I (as determined by equations (2a) and (2b)) is shown in FIGS. 2a and 2b. Presently available experimental intercalation batteries have Figures of Merit, $F_M$, in the range 200–2000 (watt-hrs./kg)$^2$ sec$^{-1}$. Although these cells have high capacity, their discharge current is relatively low. By comparison, the Figure of Merit of conventional lead-acid batteries is about 400 (watt-hrs./kg)$_2$ sec$^{-1}$. Although such batteries have relatively low capacity, they are capable of very high discharge current.

The present invention is concerned with a battery in which the characteristics of intercalation batteries are improved by reducing the effective cathode time constant, t. Very large improvements in cell capacity and discharge current result, particularly in cases where the time constant characterizing the cathode is long, e.g. MoS$_2$ cathodes made of naturally occurring molybdenite.

Since the characteristic time constant, t, is proportional to the square of the average cathode grain radius L, and inversely proportional to the cation diffusion coefficient, D, as recited in equation 1; t may be reduced by decreasing the grain size or by increasing the diffusion coefficient. Grain size may be reduced, e.g. by grinding, but it is not practical to reduce the average grain size much below 1 micron ($10^{-4}$ cm). Further reduction of t implies increasing the diffusion coefficient D. It is well known that this may be achieved by increasing the temperature. However, this approach is often undesirable in battery applications, since it implies that some means of heating must be provided.

(The present invention is applicable where discharge current is affected by cation diffusion. The inventors believe that in some cases, e.g. where there is very small cathode material grain size, discharge current may be affected predominantly by other physical mechanisms, in which cases intercalation of a dopant may not significantly improve discharge current, except possibly at low temperatures where cation diffusion proceeds at a slower rate.)

Since diffusion is an activated process involving interatomic potential barriers, one may increase the diffusion coefficient, D, by separating adjacent molecular layers of the host lattice. In a given layered compound adjacent molecular layers are separated by the van der Waals gap. The van der Waals gap may be widened by intercalating small amounts of ions of larger ionic radius than the cations which are to be diffused into the cathode during battery discharge. Widening of the van der Waals gap in this manner facilitates subsequent cation diffusion. The cathode may be pre-treated with large ions by intercalating them into the cathode in any manner known to the art.

If the van der Waals gap is so narrow that cations cannot readily enter the lattice structure, they tend to clog the surface of the structure. If the van der Waals gap is widened, cations will be more readily diffused into the lattice structure. The additive material used to spread adjacent molecular layers apart has been termed herein a "dopant."

If it is desired to intercalate lithium cations into a dichalcogenide, the lattice structure is first treated with a dopant having a larger ionic radius than lithium ions to ease their subsequent intercalation between the molecular layers of the lattice structure. For example, the sodium ion which has an ionic radius of 0.98 angstroms is a suitable dopant for the intercalation of the lithium ion which has an ionic radius of 0.68 angstroms.

Any atomic or ionic material having a larger ionic radius than the cations to be intercalated into the cathode may be used as a dopant, provided the dopant does not react chemically with either the cathode or with the cations or otherwise interfere with the operation of the battery. For practical purposes, the ionic diameter of the dopant should exceed the cation diameter by at least 0.1 angstroms.

Sodium and potassium ions have been utilized as preferred dopants where $Li^+$ or $Mg^{++}$ cations are used. However, it is believed that cesium and rubidium may also be used as dopants, based on knowledge that these elements intercalate, are of satisfactorily large ionic radius and are not expected to generate deleterious side effects. Selected organic dopants are also expected to be satisfactory; excellent separation of the van der Waals gap by intercalation of aniline, pyridine and other organic compounds has been reported by F. R. Gamble et al, 174 Science 493 Oct. 29, 1971) in a paper entitled "Intercalation Complexes of Lewis Bases and Layered Sulfides: A Large Class of New Superconductors."

The capacity of a given battery is proportional to the number of sites available in the cathode lattice structure for deposit of cations. In layered transition metal dichalcogenide compounds, such sites occur in the van der Waals gap at symmetrically recurring intervals defined by the relative spacing or positioning of adjacent molecular layers.

Intercalation of dopant ions to widen the van der Waals gap reduces the theoretical maximum capacity of the battery since sites filled by dopant ions are no longer available for the deposit of cations. However, widening of the van der Waals gap by intercalation of dopant ions results in a shift of the relative spacing or positioning of adjacent molecular layers which alters the symmetric distribution of sites available for the deposit of cations and gives rise to additional sites at which cations may be deposited. Battery capacity increases correspondingly.

The amount of dopant present should spread adjacent molecular layers sufficiently far apart to facilitate the entry of cations. In some cases, deposit of dopant ions at as few as 5% of the sites where cations may rest will serve to spread the molecular layers sufficiently to facilitate entry of cations. In other cases, deposit of dopant at up to 40% of the potential sites for cations may be required. Deposit of dopant ions at more than 40% of the potential sites will not increase the distance between adjacent molecular layers so further doping appears unnecessary. Stated another way, x in $A_xMoS_2$ ranges between 0.05 and 0.4 where A is the cathode dopant material.

In experiments carried out, the cathode materials where $TiS_2$ or $MoS_2$, the cations were $Li^+$ or $Mg^{++}$ and the cathode dopants were Na or K. A wide variety of electrolytes were used including $LiClO_4$ in propylene carbonate (PC) or Tetrahydrofuran-Dimethoxyethane (THF:DMOE 7:3), LiBr in propylene carbonate and $MgCl_2$ in $H_2O$. In the last case, the intercalation of hydrated Mg is followed by in situ conversion to $Mg(OH)_2$ accompanied by $H_2$ evolution.

EXAMPLE 1

A battery was constructed using lithium as the anode and a single flake of molybdenum disulfide as the cathode with acetonitrile containing 1 M $LiClO_4$ as the electrolyte. The cathode was not treated with dopant in this example. The open circuit voltage of the battery was found to be 2.86 volts and the initial short circuit current was found to be 0.8 milliamps.

EXAMPLE 2

A battery was constructed with the identical materials as in Example 1, except that between 10% and 50% of the sites where the $Li^+$ cations would rest were previously doped with potassium ions. Doping was accomplished by dissolving potassium in liquid ammonia and inserting the molybdenum disulphide crystal in the resulting solution. The potassium ions spontaneously soak into the $MoS_2$ lattice structure. This battery was tested and found to have an open circuit voltage of 2.5 volts, slightly less than the open circuit voltage of the nondoped battery of Example 1. The short circuit current was found to be 17 milliamps, as compared to the 0.8 milliamps of the non-doped battery in Example 1.

EXAMPLE 3

Figure 3:
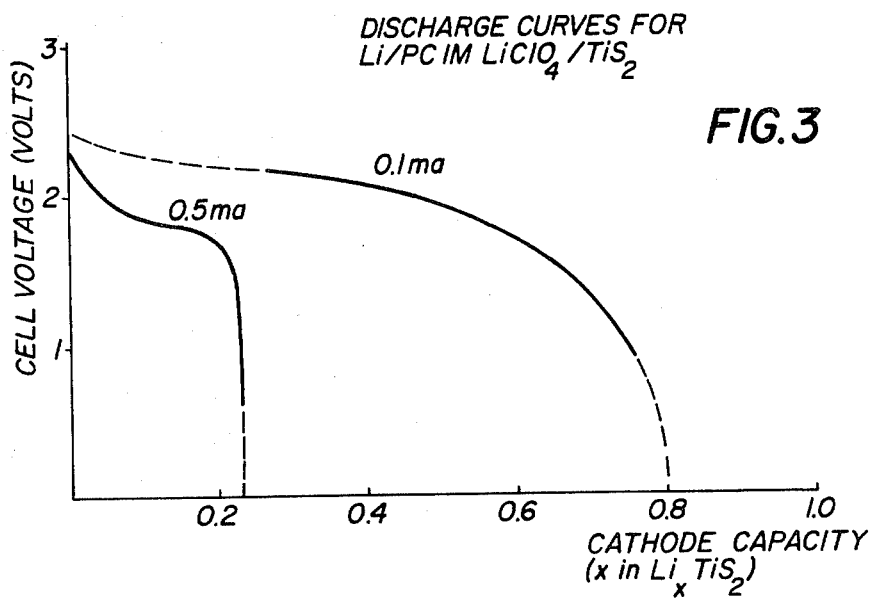
FIG. 3 shows empirical discharge curves for Li/PC 1 M LiClO$_4$/TiS$_2$.

The dependence of cell capacity on discharge rate is illustrated by the data in FIG. 3 which were obtained using a Li/PC-1 M $LiClO_4/TiS_2$ cell. The cathode weight was 73 mg and the maximum capacity, corresponding to $x=1$ in $Li_xTiS_2$, is thus about 64 coulombs. At a discharge current of 0.5 ma the actual available capacity was only about 15 coulombs, corresponding to $x=0.23$ in FIG. 3. At a discharge current of 0.1 ma the available capacity increases to about 51 coulombs corresponding to $x \approx 0.8$ in FIG. 3. This behaviour is in approximate agreement with theoretical expectations based on FIG. 1. The latter would predict an available capacity corresponding to $x=0.75$ as a result of the current reduction to 0.1 ma. The results shown in FIG. 3 clearly indicate that the discharge of the battery is limited by cation diffusion in the cathode.

EXAMPLE 4

Figure 4:
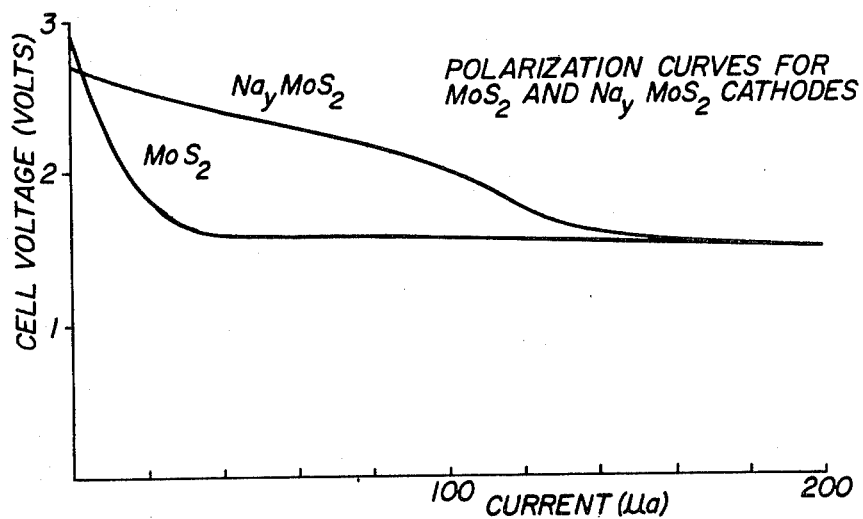
FIG. 4 shows empirical polarization curves for MoS$_2$ and Na$_y$MoS$_2$ cathodes.

The effect of a cathode dopant on the cation diffusion rate is illustrated by the data in FIG. 4. This figure shows polarization curves for two cells, namely Li/THF:DMOE (7:3)LiClO$_4$/MoS$_2$ and Li/THF:DMOE (7:3) LiClO$_4$/Na$_y$MoS$_2$. The two cells were identical in every respect (cathode weight 13 mg) except that the cathode of the Na$_y$MoS$_2$ cell had been pretreated with a Na dopant using the ammonia process. The amount of Na dopant added was small, corresponding to $y \approx 0.2$ in Na$_y$MoS$_2$. The two cells show a high voltage (V>1.6 volts) intercalation regime and a low voltage regime (V<1.6 volts) corresponding to electrolyte decomposition. The transition to this second regime occurs at very small current levels ($I \approx 20$ μa) with the pure MoS$_2$ cathode whereas it is delayed to a current of about 120 μa with the Na$_y$MoS$_2$ cathode. In accordance with the previous discussion and with FIG. 1, these results indicate an increase of the effective cation diffusion coefficient by nearly an order of magnitude.

It will be seen that doping the cathode of a layered transition metal dichalcogenide battery increases the storage density substantially, especially at large discharge current densities, by facilitating diffusion of cations into the lattice structure.

What is claimed is:

1. A battery comprising:
   (a) an anode consisting essentially of a material selected from the group consisting of lithium and magnesium,
   (b) a cathode consisting essentially of a layered transition metal dichalcogenide which has been pretreated by intercalating a relatively small amount of a suitable selected dopant having a relatively large atomic molecular or ionic radius with respect to the radius of cations migrating to and intercalating in the cathode during discharge of the battery, so as to permit more rapid intercalation of the cathode by said cations, said layered transition metal dichalcogenide being selected from the group consisting of molybdenum disulphide and titanium disulphide, said dopant being selected from the group consisting of sodium, potassium, cesium and rubidium, and
   (c) a suitable selected liquid electrolyte in which the migration of said cations occurs during discharge of the battery.

2. A battery as defined in claim 1, wherein the cathode consists essentially of molybdenum disulphide.

3. A battery as defined in claim 2, wherein the cation is lithium.

4. A battery as defined in claim 3 where the dopant material is selected from the group consisting of sodium and potassium.

5. A battery as defined in claim 3 wherein the cathode material has the general Formula A$_y$MoS$_2$ where A is the dopant and y has a value of about 0.1.

6. A battery as defined in claim 2, wherein the cation is Magnesium.

7. A battery as defined in claim 6 wherein the dopant material is selected from the group consisting of sodium and potassium.

8. A battery as defined in claim 7 wherein the cathode material has the general Formula A$_y$MoS$_2$ where A is the dopant and y has a value of about 0.1.

9. A battery as defined in claim 1 wherein the cathode material has the general formula A$_y$TiS$_2$, where A is the dopant and y lies in the range $0.05 < y < 0.4$.

10. A battery as defined in claim 1 wherein the cathode material has the general formula A$_y$MoS$_2$, where A is the dopant and y lies in the range $0.05 < y < 0.4$.

11. A battery as defined in claim 1 wherein the cathode material has the general formula A$_y$TiS$_2$ where A is the dopant and y has a value of about 0.1.

12. A battery as defined in claim 11, wherein the cation is lithium.

13. In a battery comprising an anode, a cathode consisting essentially of a layered transition metal dichalcogenide, and an electrolyte, said battery being of the type wherein cations migrate through said electrolyte to and intercalate in said cathode during discharge thereof, the improvement wherein said layered transition metal dichalcogenide has been pre-treated by intercalating a relatively small amount of a suitable selected dopant having a relatively large atomic molecular or ionic radius with respect to the radius of said cations.

14. A battery as defined in claim 13, wherein the cathode consists essentially of molybdenum disulphide.

15. A battery as defined in claim 14, wherein the cation is lithium.

16. A battery as defined in claim 15, wherein the dopant material is selected from the group consisting of sodium, potassium, cesium and rubidium.

17. A battery as defined in claim 15, wherein the dopant material is selected from the group consisting of sodium and potassium.

* * * * *